United States Patent
Ojha

(10) Patent No.: US 11,361,097 B2
(45) Date of Patent: Jun. 14, 2022

(54) DYNAMICALLY GENERATING SHARING BOUNDARIES

(71) Applicant: Box, Inc., Redwood City, CA (US)

(72) Inventor: Alok Ojha, Newark, CA (US)

(73) Assignee: Box, Inc., Redwood City, CA (US)

( * ) Notice: Subject to any disclaimer, the term of this patent is extended or adjusted under 35 U.S.C. 154(b) by 311 days.

(21) Appl. No.: 16/553,073

(22) Filed: Aug. 27, 2019

(65) Prior Publication Data
US 2020/0067936 A1     Feb. 27, 2020

Related U.S. Application Data

(60) Provisional application No. 62/723,314, filed on Aug. 27, 2018.

(51) Int. Cl.
*G06F 21/62* (2013.01)
*G06F 21/53* (2013.01)
(Continued)

(52) U.S. Cl.
CPC .......... *G06F 21/6218* (2013.01); *G06F 16/11* (2019.01); *G06F 21/53* (2013.01);
(Continued)

(58) Field of Classification Search
CPC ...... G06F 21/6218; G06F 16/11; G06F 21/53; G06F 21/577; G06F 21/6227; G06F 2221/034; G06N 20/00; G06N 5/04; H04L 63/102; H04L 63/105; H04L 63/107; H04L 63/1416; H04L 63/1466; H04L 67/06;
(Continued)

(56) References Cited

U.S. PATENT DOCUMENTS 9,928,241 B2 *  3/2018  Frei ........................ G06F 40/12
2008/0154967 A1 *  6/2008  Heikes ................... H04L 51/32
(Continued)

OTHER PUBLICATIONS

Sociality brings Security in Content Sharing. Chowhury. Academy Publisher. (Year: 2010).*

(Continued)

*Primary Examiner* — Venkat Perungavoor
(74) *Attorney, Agent, or Firm* — Vista IP Law Group, LLP

(57) ABSTRACT

A collaboration system provides network access to a plurality of content objects. The collaboration system facilitates collaboration interactions between particular users by allowing or denying network access to the plurality of content objects based on user invitations. A computing module observes and records user-to-user or user-to-content collaboration invitations over the plurality of content objects. On an ongoing basis, a collaboration network graph is constructed and maintained, with updates to the collaboration network graph being continually applied based on observed collaboration interactions. On demand, such as upon receipt of a user request for access to a content object, the updated collaboration network graph is consulted so as to generate a then-current sharing boundary. If the user that raised the user request is within the generated then-current sharing boundary, then access to the content object is granted, otherwise further processing is invoked to determine if the user should nevertheless be granted access.

20 Claims, 9 Drawing Sheets

(51) Int. Cl.
*G06F 16/11* (2019.01)
*H04L 9/40* (2022.01)
*H04L 67/06* (2022.01)
*H04L 67/55* (2022.01)
*G06N 20/00* (2019.01)
*G06N 5/04* (2006.01)
*G06F 21/57* (2013.01)
*G06F 21/50* (2013.01)

(52) U.S. Cl.
CPC ........ *G06F 21/577* (2013.01); *G06F 21/6227* (2013.01); *G06N 5/04* (2013.01); *G06N 20/00* (2019.01); *H04L 63/102* (2013.01); *H04L 63/105* (2013.01); *H04L 63/107* (2013.01); *H04L 63/1416* (2013.01); *H04L 63/1466* (2013.01); *H04L 67/06* (2013.01); *H04L 67/26* (2013.01); *G06F 2221/034* (2013.01)

(58) Field of Classification Search
CPC . H04L 67/26; H04L 63/101; H04L 29/06829; G05B 2219/40446; G05B 2219/32131; G06K 9/6224; G06T 7/162; G06Q 10/103
See application file for complete search history.

(56) References Cited

U.S. PATENT DOCUMENTS

| 2015/0379887 | A1* | 12/2015 | Becker | G09B 17/003 |
| | | | | 715/229 |
| 2017/0185592 | A1* | 6/2017 | Frei | G06F 16/41 |
| 2017/0193448 | A1* | 7/2017 | Piyush | H04L 67/12 |
| 2018/0115603 | A1* | 4/2018 | Hu | G06F 16/24578 |
| 2018/0124159 | A1* | 5/2018 | Sun | H04L 67/306 |
| 2021/0157858 | A1* | 5/2021 | Stevens | G06F 16/90335 |
| 2021/0160340 | A1* | 5/2021 | Narayanan | H04L 9/3239 |

OTHER PUBLICATIONS

Enhancing synchronous collaboration by using interactive visualisation of modelled traces. Clauzel. Elsevier. (Year: 2010).*

Visualizations of Collaborative Information for End-Users. Xiong. (Year: 1999).*

* cited by examiner

DYNAMICALLY GENERATING SHARING BOUNDARIES

CROSS-REFERENCE TO RELATED APPLICATION(S)

The present application claims the benefit of priority to U.S. Patent Application Ser. No. 62/723,314 titled "COLLABORATION SYSTEM SECURITY", filed on Aug. 27, 2018, which is hereby incorporated by reference in its entirety.

FIELD

This disclosure relates to collaboration systems, and more particularly to techniques for dynamically generating sharing boundaries.

BACKGROUND

In modern collaboration systems, a large portion of the collaboration activity involves users sharing certain content objects with other users. In many systems, users share a content object by distributing a link (e.g., hyperlink, weblink, etc.) to the content object rather than distributing the actual content object. When a user receives such a link at a user device and follows (e.g., clicks on) the link, an application (e.g., web browser or web-enabled function) at the user device is directed to a resource location at the collaboration system. The collaboration system in turn checks the user's credentials and, if the user is provisioned sufficient access rights, then access to the content object is granted. Such access might invoke a download of the content object, or a preview of the content object, to the user device of the user.

Users today demand that collaboration systems offer certain predefined access models to make content object sharing convenient and efficient. As examples, such access models might facilitate a user sharing a content object with (1) any user who is on a particular collaboration list (e.g., as specified by the user), (2) any user who authenticates with a particular domain (e.g., "CompanyName.com") or, (3) any user who has the link.

While the sharing boundary of the first two example models is strictly defined (e.g., by the collaboration list and the domain), the sharing boundary of the latter model is uncertain. Specifically, in this latter case, it is possible that a legitimate, intended recipient (e.g., a user to whom the sender intended to receive a link) might forward the link to an unintended recipient. For example, the sender may have used the unrestricted link sharing model in error or may have expected the recipients to abstain from not forwarding the link. Even the other aforementioned access models can be misused. As examples, a user might inadvertently add (e.g., typo, type-ahead error, wrong name, etc.) one or more unintended recipients to a collaboration list or select a wrong (e.g., unintended) domain.

Unfortunately, there is no mechanism in today's collaboration systems for detecting and remediating such unintended content object sharing events. The lack of such a mechanism can be extremely costly to an enterprise or even individual users. For example, a CEO who sends a document intended for only his or her staff to the entire organization, or worse, to recipients outside the organization, can suffer severe consequences. In many cases, the user (e.g., document owner) who first shared a content object may not even know that the content object was accessed by unintended recipients. What is needed is a way to detect and remediate unintended access to content objects by users in a collaboration system.

SUMMARY

The present disclosure describes techniques used in systems, methods, and in computer program products for dynamically generating sharing boundaries, which techniques advance the relevant technologies to address technological issues with legacy approaches. More specifically, the present disclosure describes techniques used in systems, methods, and in computer program products for dynamic generation of sharing boundaries. Certain embodiments are directed to technological solutions for consulting actively-updated collaboration network graphs to determine the sharing boundaries of content objects.

The disclosed embodiments modify and improve over legacy approaches. In particular, the herein-disclosed techniques provide technical solutions that address the technical problems attendant to unintended access to content objects by users in a collaboration system. Such technical solutions involve specific implementations (i.e., data organization, data communication paths, module-to-module interrelationships, etc.) that relate to the software arts for improving computer functionality.

The disclosed techniques for consulting actively-updated collaboration network graphs to determine the sharing boundaries of content objects overcome long standing yet unsolved technological problems associated with unintended access to content objects by users in a collaboration system that arise in the realm of computer systems.

Many of the herein-disclosed techniques repeatedly consult actively-updated collaboration network graphs to determine the sharing boundaries of content objects. These techniques are technological solutions pertaining to technological problems that arise in the hardware and software arts that underlie collaboration systems. Aspects of the present disclosure achieve performance and other improvements in peripheral technical fields including (but not limited to) human-machine interfaces and cybersecurity.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
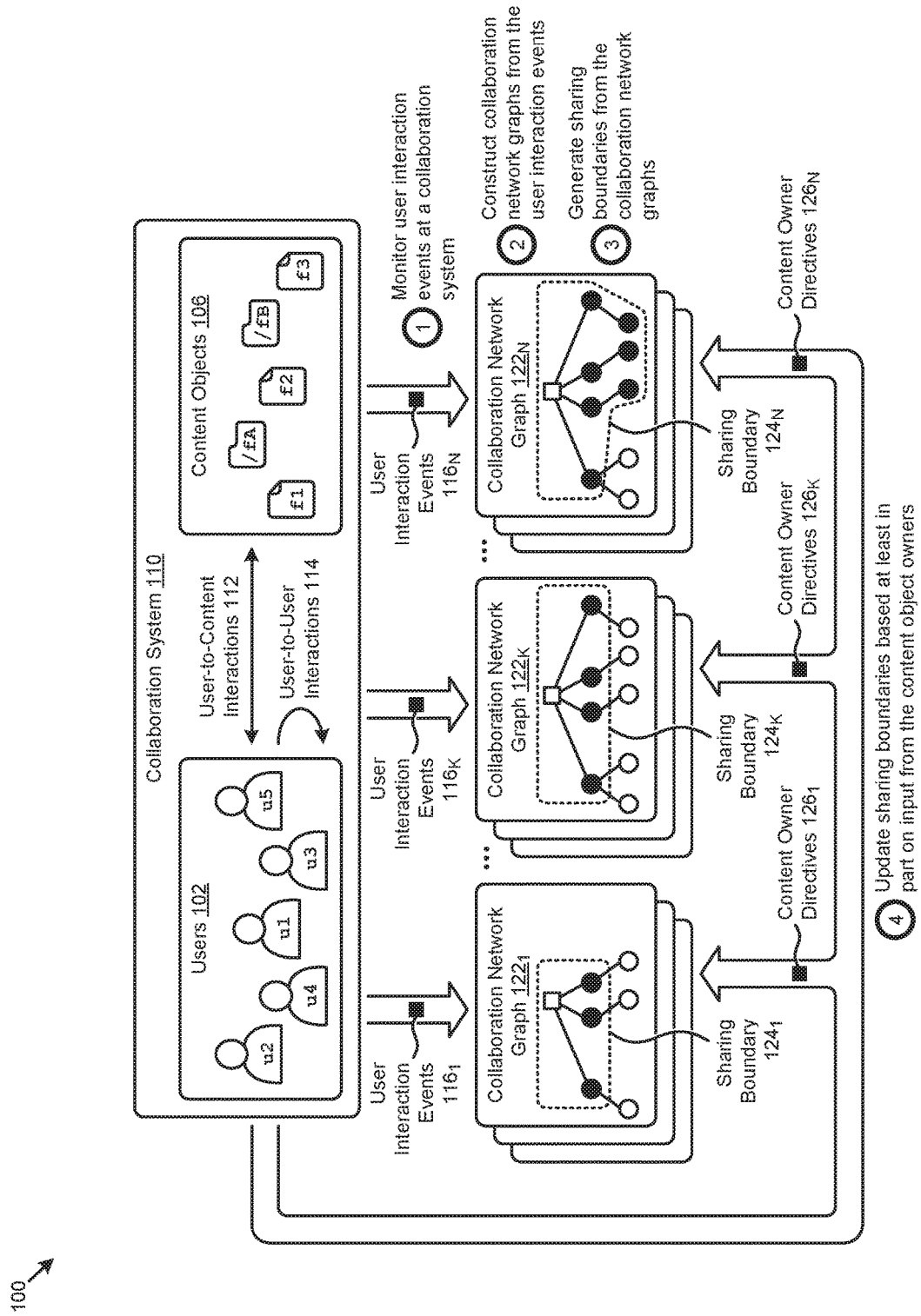
FIG. 1 illustrates a computing environment in which embodiments of the present disclosure can be implemented.

Aspects of the present disclosure solve problems associated with using computer systems for unintended access to content objects by users in a collaboration system. These problems are unique to, and may have been created by, various computer-implemented methods used in collaboration systems. Some embodiments are directed to approaches for consulting actively-updated collaboration network graphs to determine the sharing boundaries of content objects. The accompanying figures and discussions herein present example environments, systems, methods, and computer program products for dynamic generation of sharing boundaries.

Overview

Disclosed herein are techniques for consulting actively-updated collaboration network graphs to determine the sharing bounds of content objects. In certain embodiments, collaboration interaction events (e.g., user-to-content collaboration interactions, user-to-user collaboration interactions, etc.) at a collaboration system are actively monitored and processed to generate the collaboration network graphs. As used herein, a collaboration network graph is a logical representation (e.g., involving one or more data structures) of the entities (e.g., users, content objects, etc.) of a collaboration system and their relationships between such entities. When a collaboration network graph is implemented as nodes and edges between nodes, the nodes correspond to entities and the edges correspond to relationships between any two entities. Some implementations of a collaboration network graph characterize relationship strengths between a particular subject user and various other users. The relationship strength can be characterized as a relationship type and/or a relationship magnitude. Relationship strengths can also be characterized by degrees of separation between two entities.

When a particular subject user (e.g., content object owner) identifies a content object for sharing, a then-current instance of a collaboration network graph is accessed to determine a sharing boundary for the particular subject user. Subsequent to the sharing, and responsive to the act of another user's requested access of the shared content object, the then-current sharing boundary is consulted. The then-current sharing boundary is used to determine which other users are able to access the content object. If access to a content object by a suspect recipient is detected (e.g., a user whose user node in the collaboration network graph is outside of the sharing boundary), an alert is issued to the subject user (e.g., the sharer). An updated sharing boundary is then generated based at least in part on the response to the alert from the subject user.

For example, the subject user might allow the suspect recipient to access the content object, thereby expanding the sharing boundary to an updated sharing boundary that includes at least the suspect recipient. In certain embodiments, the updated sharing boundary might include other users that share certain user attributes (e.g., department, email domain, etc.) with the suspect recipient. In certain embodiments, the sharing boundary is based at least in part on a number of degrees of separation the users within the boundary are from the subject user (e.g., as indicated by the then-current collaboration network graph). In certain embodiments, the sharing boundary is based at least in part on a rule base (e.g., a policy). In certain embodiments the collaboration network graph and/or the sharing boundary are actively updated in response to the detection of the user interaction events and/or other non-interaction data. In certain embodiments, the sharing boundary is dynamically updated based on a relationship between a user requesting access and other users, such as users in the same cohort of another enterprise.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to consulting actively-updated collaboration network graphs to determine the sharing boundaries of content objects. Specifically, the figure presents a logical depiction of how the herein disclosed techniques can be used in a computing environment to dynamically generate sharing boundaries to prevent unintended access to content objects by users in a collaboration system.

The logical depiction of FIG. 1 illustrates a selected set of users (e.g., user "u1", user "u2", user "u3", user "u4", and user "u5") from a plurality of users 102 in a collaboration system 110 that interact with each other through instances of user-to-user interactions 114. For example, a first user might raise a sharing invitation to a second user to collaborate on some task, and/or might raise multiple sharing invitations that comprise requests to join a group of other users. A user-to-user interaction may also be based on an implicit user-to-user relationships (e.g., based on organizational structures). Any of users 102 might also invoke certain instances of user-to-content interactions 112 with various instances of content objects 106 (e.g., folder "/fA", file "f1", folder "/fB", file "f2", and file "f3"). As an example, a first user might create a document and then share the document with other users for viewing, editing, or commenting on by the other users. For a user-to-user interaction, the collaboration "entities" are both users, whereas for a user-to-content interaction, the entities include a user and a content object.

In modern collaboration systems, such as collaboration system 110, users 102 might share content objects by distributing links (e.g., hyperlinks, weblinks, etc.) to the content objects rather than distributing the actual content objects. When a user receives such a link at a user device and follows (e.g., clicks on) the link, an application (e.g., web browser or web-enabled function) at the user device is directed to a resource location at collaboration system 110. Collaboration system 110 in turn checks the user's credentials, and if the user is provisioned sufficient access rights, then access to the content object is granted or allowed. Such access might invoke a download of the content object or a preview of the content object to the user device of the user.

Various predefined access models exist to facilitate efficient sharing of content objects. As examples, such access models might facilitate a user sharing a content object with any user who (1) is on a particular collaboration list (e.g., as specified by the user), (2) authenticates with a particular domain (e.g., "CompanyName.com") or, (3) has a link to a content object. While the sharing boundary of the first two example models is strictly defined (e.g., by the collaboration list and the domain), the sharing boundary of the latter model is uncertain. Specifically, and in this latter case, it is possible that a legitimate, intended recipient (e.g., a user to whom the sender intended to receive a link) might forward the link to an unintended recipient.

The herein disclosed techniques address the problems attendant to such unintended access to content objects by consulting actively-updated collaboration network graphs to determine the sharing boundaries of the content objects. The dynamically-generated sharing boundaries are analyzed to allow or deny access to users requesting the content objects.

Specifically, and as shown in computing environment 100, various user interaction events associated with user-to-content interactions 112 and user-to-user interactions 114 are actively monitored at collaboration system 110 (operation 1). User interaction events are processed to construct one or more collaboration network graphs associated with users 102 and content objects 106 (operation 2).

A collaboration network graph, as used herein, is a logical representation (e.g., graph) of entities (e.g., users, content objects, etc.) of a collaboration system and their relationships. The nodes of the collaboration network graph correspond to the entities and the edges of the collaboration network graph correspond to the entity relationships. One implementation of a collaboration network graph might characterize the relationship strength (e.g., degree of separation) between a particular subject user and various other users (e.g., collaborators). As an example, at a first moment in time, a set of user interaction events $116_1$ might be analyzed to construct a collaboration network graph $122_1$ that pertains to a particular user.

Sharing boundaries associated with the collaboration network graphs are generated (operation 3). As can be observed, a sharing boundary $124_1$ associated with collaboration network graph $122_1$ is generated. As representative of merely one example, sharing boundary $124_1$ is shown as a contour over the collaboration network graph that subsumes a set of users. In this example, the sharing boundary depicts that only certain users who are only at one degree of separation from a subject user might be allowed access to various content objects owned by the subject user.

In this case, the owner may have issued instances of content owner directives $126_1$ that state that users within one degree of separation, as determined by the then-current collaboration network graph (e.g., collaboration network graph $122_1$), are to be included in sharing boundary $124_1$. As used herein, such content owner directives comprise information from content owners or representative of content owners (e.g., an enterprise system administrator) that serves to define the constraints (e.g., permissions) pertaining to access of the content objects. As an example, content owner directives might be captured at a user interface and codified (e.g., as attributes, as parameters, as logic, etc.) into certain sharing policies or access rules. As later discussed, content owner directives may be derived from responses to access request alerts that are issued to content owners.

At a second moment in time, additional user interaction events (e.g., user interaction events $116_K$) are processed to facilitate construction of an updated collaboration network graph such as is depicted in collaboration network graph $122_K$. As shown, entities are added to collaboration network graph $122_1$ to form collaboration network graph $122_K$. The content owner directives (e.g., content owner directives $126_K$) issued by the subject user associated with collaboration network graph $122_K$ results in the shown sharing boundary $124_K$. Specifically, and as depicted in this example, content owner directives $126_K$ may have denied all content object access requests issued by users (e.g., unintended recipients of a sharing URL) beyond one degree of separation.

In other cases, however, the sharing boundaries are updated based at least in part on input from the content object owners (operation 4). As shown, at some third moment in time, instances of content owner directives $126_N$ may cause an update to the sharing boundary associated with collaboration network graph $122_K$, which updates result in the sharing boundary $124_N$ as depicted within collaboration network graph $122_N$. Specifically, and as can be observed, sharing boundary $124_N$ includes users that are at one degree of separation from the subject user as well as three other users that are at two degrees of separation from the subject user. Continuing this example, if the three users have been explicitly allowed (e.g., by the owner) to gain access to the requested content objects, that explicit allowance expands the sharing boundary to include those three additional users. Granting access to a particular one or more users that are at two degrees of separation from the subject user does not automatically imply that all users at two degrees of separation from the subject are granted access.

As another example, the sharing boundary may have been updated to include the three users due to certain user attributes (e.g., department, email domain, etc.) that are shared by the users. Moreover, the consistency between the collaboration network graphs at this third moment and the earlier mentioned second moment in time indicate that additional user interaction events (e.g., user interaction events $116_N$) did not affect the structure and/or constituency of the collaboration network graph even though the sharing boundary was updated to include the three additional users.

In any case, the dynamically-generated sharing boundaries that are overlaid onto the actively-updated collaboration network graphs serve to address the problems attendant to unintended provisioning of access to content objects by users in a collaboration system. As such, application of the techniques disclosed herein facilitate improvements in computer functionality. Specifically, consumption of such computing resources to maintain and use more rigid access models (e.g., hard-coded permissions, digital rights management, etc.) is eliminated at the same time that application of the techniques disclosed herein offer greater flexibility when sharing content objects among collaborators.

One embodiment of techniques for ongoing management of such dynamically-generated sharing boundaries is disclosed in further detail as follows.

Figure 2:
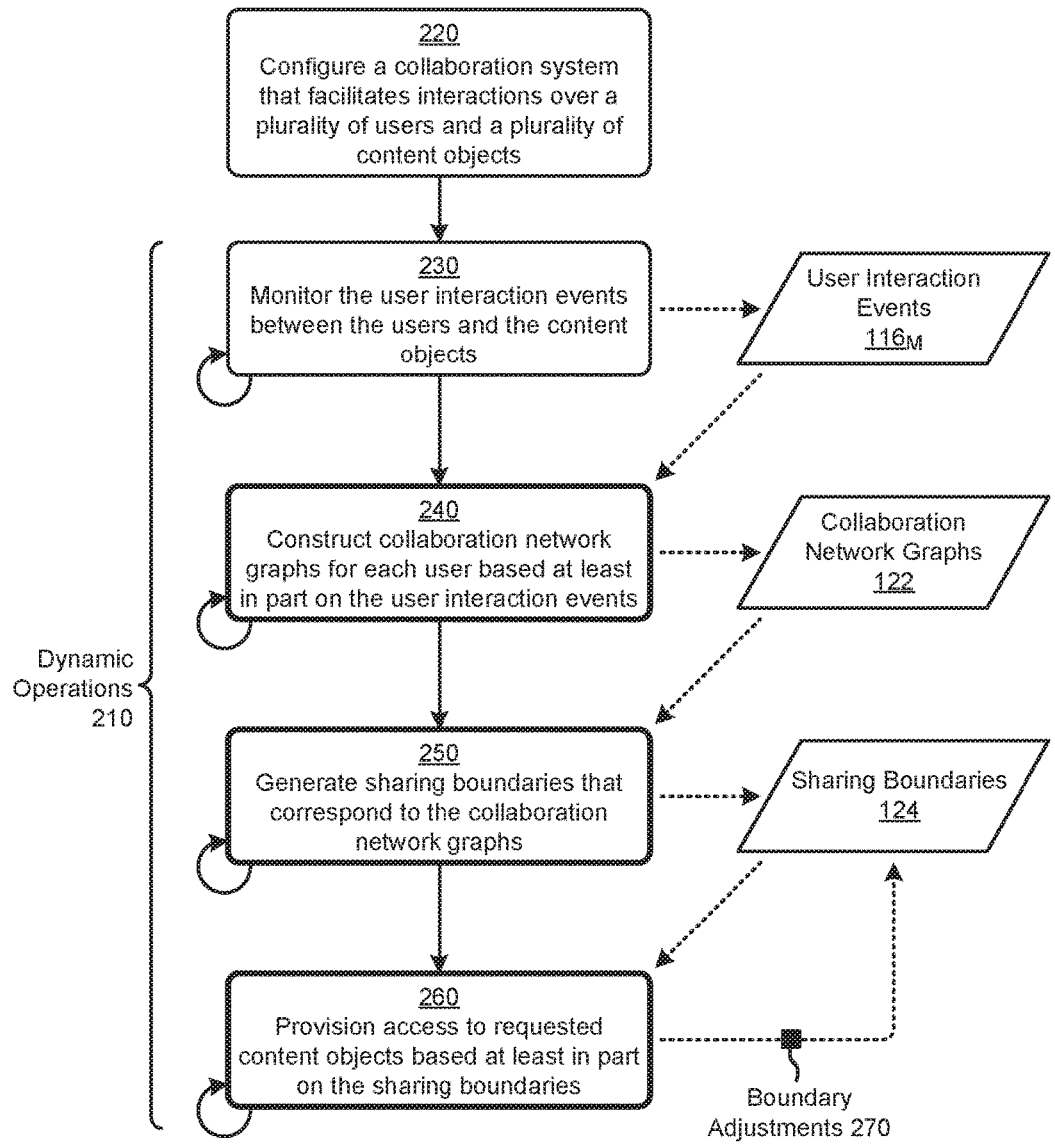
FIG. 2 depicts a sharing boundary management technique as implemented in systems that perform dynamic generation of sharing boundaries, according to an embodiment.

FIG. 2 depicts a sharing boundary management technique 200 as implemented in systems that perform dynamic generation of sharing boundaries. As an option, one or more variations of sharing boundary management technique 200 or any aspect thereof may be implemented in the context of the architecture and functionality of the embodiments described herein. The sharing boundary management technique 200 or any aspect thereof may be implemented in any environment.

FIG. 2 illustrates aspects pertaining to consulting actively-updated collaboration network graphs to determine the sharing boundaries of content objects. Specifically, the figure is presented to illustrate one embodiment of certain steps and/or operations performed over various devices (e.g., user devices, servers, systems, etc.) to dynamically manage access to a large number of content objects by a large number of users in a highly collaborative shared content management system. As can be observed, a certain portion of the steps and/or operations can be characterized as dynamic operations 210.

The sharing boundary management technique 200 commences by configuring a collaboration system that facilitates interactions over a plurality of users and a plurality of content objects managed by the system (step 220). As earlier described, such interactions comprise user-to-content interactions and user-to-user interactions, and can be characterized as discrete user interaction events. Continuous monitoring of such user interaction events between the user and the content objects is performed at the system (step 230). As shown, the monitoring might result in a set of user interaction events $116_M$ at some moment in time.

A then-current set of user interaction events are analyzed to construct one or more collaboration network graphs (step 240). For example, user interaction events $116_M$ might be analyzed to produce a set of collaboration network graphs 122. Since monitoring of user interaction events (step 230) and ongoing construction of the collaboration network graphs from user interaction events (step 240) are dynamic operations 210, the collaboration graphs are actively-updated and made accessible for use in accordance with the herein disclosed techniques. In some implementations, collaboration network graphs are user-centric. In such implementations, the collaboration network graphs characterize the relationship strengths (e.g., degrees of separation) between a particular subject user and various other users (e.g., collaborators) as being derived from the then-current user interaction events. In some implementations, collaboration network graphs represent user-to-object relationships. In such implementations, the collaboration network graphs characterize activities performed by a user on an object. In some situations, collaboration network graphs characterize aspects of content object sharing conditions (e.g., "collab-in" shares) in addition to the aforementioned user-to-object characteristics. As used herein, sharing conditions are rules or other characterizations of circumstances as to whether or not a particular user can access a particular content object. Also as used herein, sharing conditions are rules or other characterizations of circumstances as to whether or not a particular group of users can access a particular content object.

Based at least in part on the then-current, actively-updated collaboration network graphs, a respective set of sharing boundaries associated with the graphs are generated (step 250). As shown, a set of sharing boundaries 124 might be generated for collaboration network graphs 122. The sharing boundaries might be generated in response to various events, such as receiving user interaction events, access requests, or content owner directives. When requests to access content objects are received, access is provisioned in accordance with the then-current sharing boundaries associated with the requests (step 260). In some cases, an outcome of the provisioning operation might be the application of one or more boundary adjustments 270 to the sharing boundaries 124. Boundary adjustments can be made on the basis of many types of changes in a collaboration network graph. As examples, boundary adjustments 270 can be made to include new users who newly access a content object. Or, boundary adjustments 270 can be made to include users at a second or third or Nth degree, or boundary adjustments 270 can be made to exclude some or all users at a second or third or Nth degree. Boundary adjustments 270 can be made to include only users who satisfy some rule or condition such as performance of a particular activity, or who are in some way correlated in a manner that characterizes a particular user as a user who is similar to the content object owner or similar to a user who has been the subject of a previous access request approval.

In response to an access request by a user that is outside of a then-current sharing boundary, an alert might be issued to the content object owner. If the owner approves access, the response of the owner will serve as a content owner directive that adjusts (e.g., expands) the sharing boundary to include at least the requesting user. In some cases, a boundary adjustment can be made to include users who are in some way correlated to users who have been previously approved. For example, if a particular user, who is two degrees separated from the content object owner, is provisioned access (step 260), then additional users who are two degrees separated might also be included within an adjusted sharing boundary.

As indicated in the figure, generation of the sharing boundaries (step 250) and provisioning of content object access based at least in part on the sharing boundaries (step 260) are characterized as dynamic operations 210. As such, sharing boundary management technique 200 and/or other herein disclosed techniques address the problems attendant to unintended access to content objects by consulting actively-updated collaboration network graphs to dynamically determine the sharing boundaries of the content objects.

One embodiment of a system, data flows, and data structures for implementing the sharing boundary management technique 200 and/or other herein disclosed techniques, is disclosed as follows.

Figure 3:
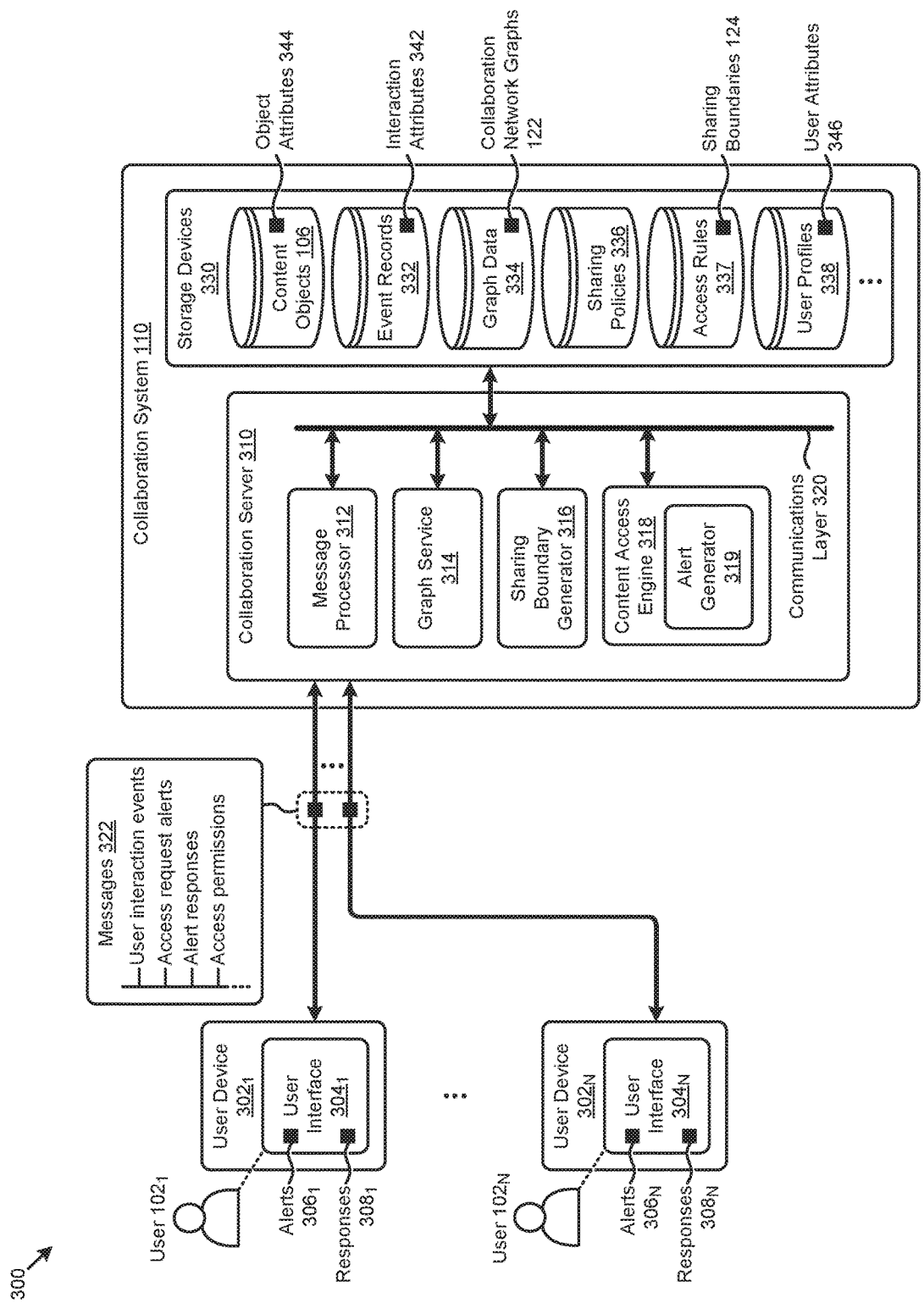
FIG. 3 is a block diagram of a system that implements techniques for dynamic generation of sharing boundaries, according to an embodiment.

FIG. 3 is a block diagram of a system 300 that implements techniques for dynamic generation of sharing boundaries. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to consulting actively-updated collaboration network graphs to determine the sharing boundaries of content objects. Specifically, the figure is being presented to show one embodiment of certain representative components and associated data structure and data flows implemented in a computing environment to facilitate the herein disclosed techniques. As shown, the components, data flows, and data structures are associated with a set of users (e.g., user $102_1$, ..., user $102_N$) that interact with each other and a set of content objects 106 managed at collaboration system 110. The components, data flows, and data structures shown in FIG. 3 present one partitioning and associated data manipulation approach. The specific example shown is purely exemplary, and other subsystems, data structures, and/or partitionings are reasonable.

As shown, system 300 comprises an instance of a collaboration server 310 operating at collaboration system 110. Collaboration server 310 comprises a message processor 312, a graph service 314, a sharing boundary generator 316, and a content access engine 318, which content access engine further comprises an alert generator 319. A plurality of instances of the foregoing components might operate at a plurality of instances of servers (e.g., collaboration server 310) at collaboration system 110 and/or any portion of system 300. Such instances can access each other (e.g., through a communications layer 320) and/or a set of storage devices 330 that store various information that facilitates the operation of the components of system 300 and/or any implementations of the herein disclosed techniques. For example, collaboration server 310 might facilitate access to shared content in content objects 106 by the users (e.g., user $102_1$, ..., user $102_N$) from a respective set of user devices (e.g., user device $302_1$, ..., user device $302_N$). The objects (e.g., files, folders, etc.) in content objects 106 are characterized at least in part by a set of object attributes 344 (e.g., content object metadata) stored at storage devices 330. Furthermore, the users are characterized at least in part by a set of user attributes 346 stored in a set of user profiles 338 at storage devices 330.

The users interact with the user interfaces (e.g., user interface $304_1$, ..., user interface $304_N$) of their user devices to send or receive various instances of messages 322 that are received or sent by message processor 312 at collaboration server 310. In some cases, certain agents or applications (e.g., a local content manager) operating at the user devices associated with the users might send or receive messages to or from collaboration server 310 without human interaction. One class of messages 322 are user interaction events that are invoked by the users when they interact with one another and/or with various content objects as facilitated by collaboration system 110. For example, users might log in to collaboration system 110 to interact with content objects they own or that are shared with them, and invite other users to collaborate on content objects and/or to perform other collaboration interactions. Any of the foregoing collaboration interactions or collaboration activities can be characterized as user interaction events.

The message processor 312 at collaboration server 310 can monitor messages 322 to detect user interaction events invoked by the plurality of users. Message processor 312 can codify certain interaction attributes 342 pertaining to the user interaction events in a set of event records 332 stored in storage devices 330. In some cases, message processor 312 will access user attributes 346 (e.g., user identifiers, etc.) stored in user profiles 338 and/or object attributes 344 (e.g., content object identifiers, etc.) stored in content objects 106 to facilitate populating the event records 332.

Event records 332 and/or any other data described herein can be organized and/or stored using various techniques. For example, event records 332 might be organized and/or stored in a tabular structure (e.g., relational database table) that has rows that relate various interaction attributes with a particular user interaction event. As another example, the event data might be organized and/or stored in a programming code object that has instances corresponding to a particular user interaction event and properties that describe the various attributes associated with the event.

In accordance with the herein disclosed techniques, interaction attributes 342 of event records 332 and/or other information at collaboration system 110 are accessed by a graph service 314 to form instances of collaboration network graphs 122. A set of graph data 334 stored at storage devices 330 codify the attributes of the collaboration network graphs 122. For example, graph data 334 codifies the entities (e.g., nodes) and entity relationships (e.g., edges) of the graphs and/or other entity attributes and entity relationship attributes (e.g., scores, weights, strengths, etc.) associated with the graphs.

Sharing boundary generator 316 accesses the then-current collaboration network graphs stored in graph data 334 and/or other information at collaboration system 110 to generate instances of sharing boundaries 124. As shown, a set of access rules 337 stored at storage devices 330 codify the attributes of sharing boundaries 124. A set of rules (e.g., rule base) such as access rules 337 or any other rules described herein comprises data records storing various information that can be used to form one or more constraints to apply to certain functions and/or operations.

For example, the information pertaining to a rule in the rule base might comprise conditional logic operands (e.g., input variables, conditions, constraints, etc.) and/or operators (e.g., "if", "then", "and", "or", "greater than", "less than", etc.) for forming a conditional logic statement that returns one or more results. More specifically, a set of access rules for a particular sharing boundary might comprise conditional logic operands that describe the characteristics of the entities (e.g., users) that are to be included within the boundary to distinguish such users from other users that are outside of the boundary. As such, sharing boundaries 124 as generated by sharing boundary generator 316 and/or any of the herein disclosed techniques and codified in access rules 337 are a logical representations of access permissions rather than fixed permissions used in other access models.

As later described in more detail, sharing boundary generator 316 might also access a set of sharing policies 336 to facilitate generation of sharing boundaries such as the shown sharing boundaries $124_K$. In this example embodiment, the sharing policies define content object sharing constraints as may be specified by content object owners, and/or as pertaining to user groups (e.g., project group, functional department, etc.), and/or as pertaining to particular enterprises in the ecosystem, etc. In some cases, the sharing policies might define sharing constraints to achieve compliance with company confidentiality guidelines, privacy regulations, and/or other requirements.

User interaction events that request access to content objects are received at message processor 312 and forwarded to content access engine 318 for processing. Content access engine 318 will consult access rules 337 to facilitate processing of the access request. Specifically, the portion of access rules 337 pertaining to a selected instance of sharing boundaries 124 associated with the access request is consulted to determine whether access is allowed or denied. If access is allowed in accordance with the selected sharing boundary, then access permissions are issued in an instance of messages 322 to the requesting user. If access is denied in accordance with the selected sharing boundary, then access permissions are not provisioned to the requesting user.

In some cases, an access request alert may be issued by alert generator 319 to a content owner in response to a denied access request. If an alert response indicates that the requesting user is to be allowed access, then one or more access permissions are sent to the requesting user. In this case, the alert response may also invoke an update to one or more of sharing boundaries 124, access rules 337, and/or sharing policies 336. As can be observed, such alerts (e.g., alerts $306_1$, . . . , alerts $306_N$) and responses (e.g., responses $308_1$, . . . , responses $308_N$) can be received and submitted at user interfaces of user devices associated with the users (e.g., content owners) associated with collaboration system 110.

The foregoing discussions include techniques for constructing collaboration network graphs based at least in part on user interaction events at a collaboration system (e.g., step 240 of FIG. 2), which techniques and data are disclosed in further detail as follows.

Figure 4:
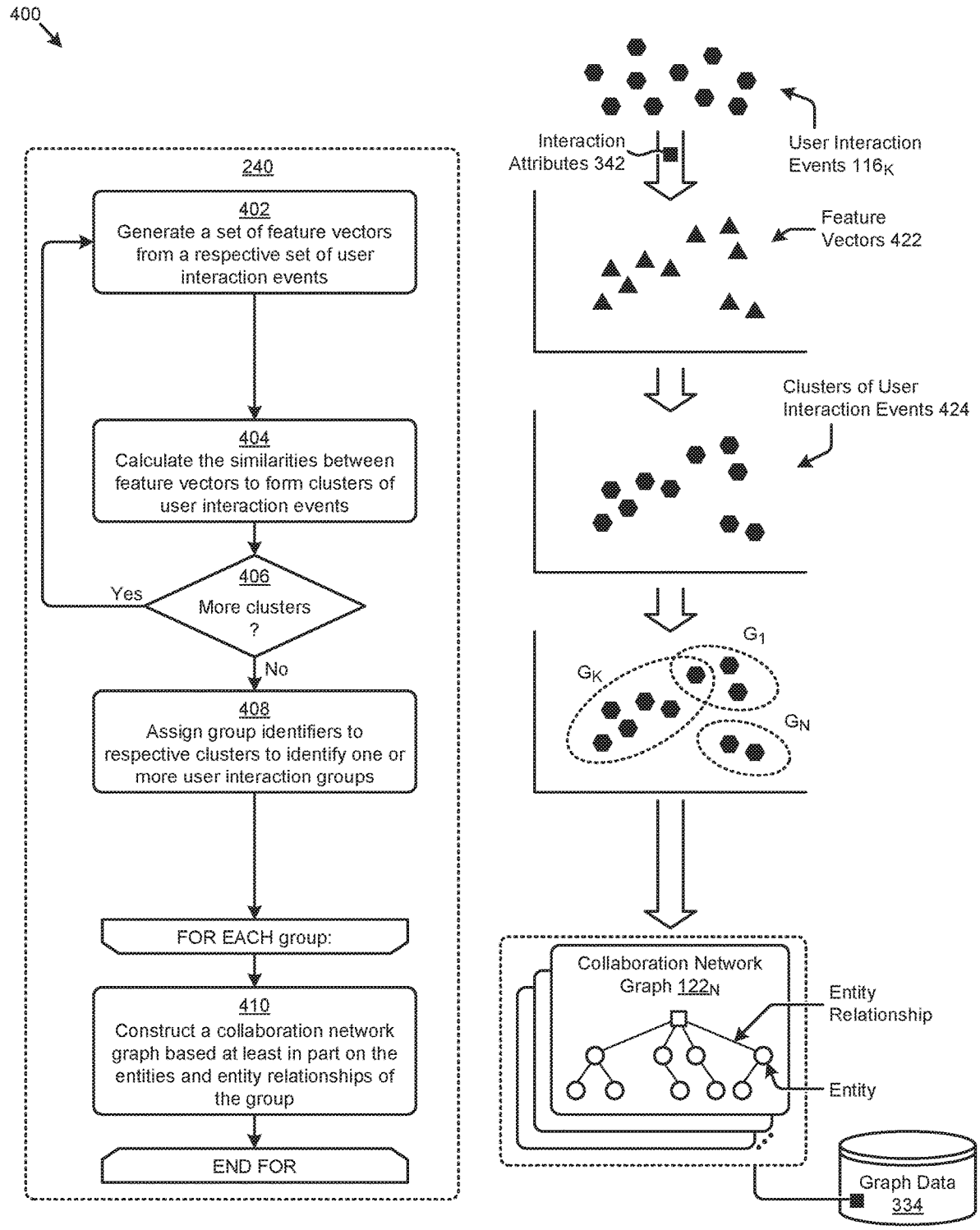
FIG. 4 depicts a collaboration network graph generation technique as implemented in systems that facilitate dynamic generation of sharing boundaries, according to an embodiment.

FIG. 4 depicts a collaboration network graph generation technique 400 as implemented in systems that facilitate dynamic generation of sharing boundaries. As an option, one or more variations of collaboration network graph generation technique 400 or any aspect thereof may be implemented in the context of the architecture and functionality of the embodiments described herein. The collaboration network graph generation technique 400 or any aspect thereof may be implemented in any environment.

FIG. 4 illustrates aspects pertaining to consulting actively-updated collaboration network graphs to determine the sharing boundaries of content objects. Specifically, the figure is presented to illustrate one embodiment of certain steps and/or operations that facilitate constructing collaboration network graphs based at least in part on user interaction events at a collaboration system (e.g., step 240 of FIG. 2). A representative collaboration network graph generation scenario is also shown in the figure to illustrate an example application of collaboration network graph generation technique 400.

Collaboration network graph generation technique 400 commences by generating a set of feature vectors from a respective set of user interaction events (step 402). As illustrated, for example, a set of feature vectors 422 might be formed from the user interaction events $116_K$. More specifically, each one of the feature vectors 422 will correspond to a respective one of user interaction events $116_K$ and comprise a respective portion of interaction attributes 342 associated with the particular event. The portion of interaction attributes 342 serve as the "features" of feature vectors 422. Such features might include one or more user identifiers, one or more content object identifiers, a timestamp, and/or other user interaction event attributes.

Similarities between the feature vectors are calculated to form one or more clusters of user interaction events (step 404). For example, a set of clusters of user interaction events 424 can be formed from feature vectors 422. Any known machine learning techniques and/or clustering techniques can be applied to the feature vectors to form the clusters. The illustrated scenario indicates that the clusters can overlap (e.g., share one or more common features, feature vectors, or underlying user interaction events). In some cases (e.g., when more computing resources and/or time are available), generation of more clusters might be performed ("Yes" path of decision 406). Such additional clusters might be generated from an additional set of user interaction events (e.g., from an earlier historical period) or from a reapplication of a clustering technique (e.g., a different clustering technique, the same clustering technique with different constraints, etc.).

The one or more clusters of user interaction events are assigned group identifiers to identify a respective one or more user interaction groups (step 408) (e.g., once the "No" path of decision 406 is taken). As shown, the clusters of user interaction events 424 are assigned group identifiers (e.g., $G_K$, $G_J$, and $G_N$) to identify a respective cluster of interaction events. For each of the assigned user interaction groups, a collaboration network graph that corresponds to the group is constructed (step 410). A collaboration network graph characterizes the entities and entity relationships that comprise an interaction event group. There are many ways to generate a collaboration network graph and there are many ways to classify the entities and entity relationships that comprise an interaction event group.

Strictly as examples, a particular collaboration network graph might correspond to interaction group $G_K$, where quantitative similarities of characteristics of the users and/or quantitative similarities among the relationships between the users constitute a group. Additionally, or alternatively, a particular collaboration network graph might be constructed to correspond to an interaction group that is formed on the basis of a constituent's membership in the same organization (e.g., membership in the marketing department, or membership in the engineering department, etc.). Additionally, or alternatively, particular collaboration network graph might be constructed to correspond to an interaction group that is formed on the basis of a constituent's membership in the same collaboration group as other constituents, and/or on the basis of a constituent's membership in the same object access group as other constituents, and/or on the basis of a constituent's membership in another object access group that is different from the former object access group, and/or an interaction group might be formed on basis of how many times a given user or set of users have accessed a particular content object or set of content objects.

Additionally, or alternatively, a particular collaboration network graph might be constructed to correspond to an interaction group that is formed on the basis of a relationship type (e.g., pertaining to a particular activity or permission), or on the basis of "closeness" (e.g., degrees of separation), or on the basis of similarities of activities, or on the basis of the type of invitations, and/or based on rights and/or permissions granted (e.g., permissions or invitations to edit, permissions or invitations to preview, etc.).

As illustrated, the collaboration network graphs for each user interaction group can be codified and stored as graph data 334.

The foregoing discussions include techniques for generating sharing boundaries that are associated with the collaboration network graphs (e.g., step 250 of FIG. 2), which techniques are disclosed in further detail as follows.

Figure 5:
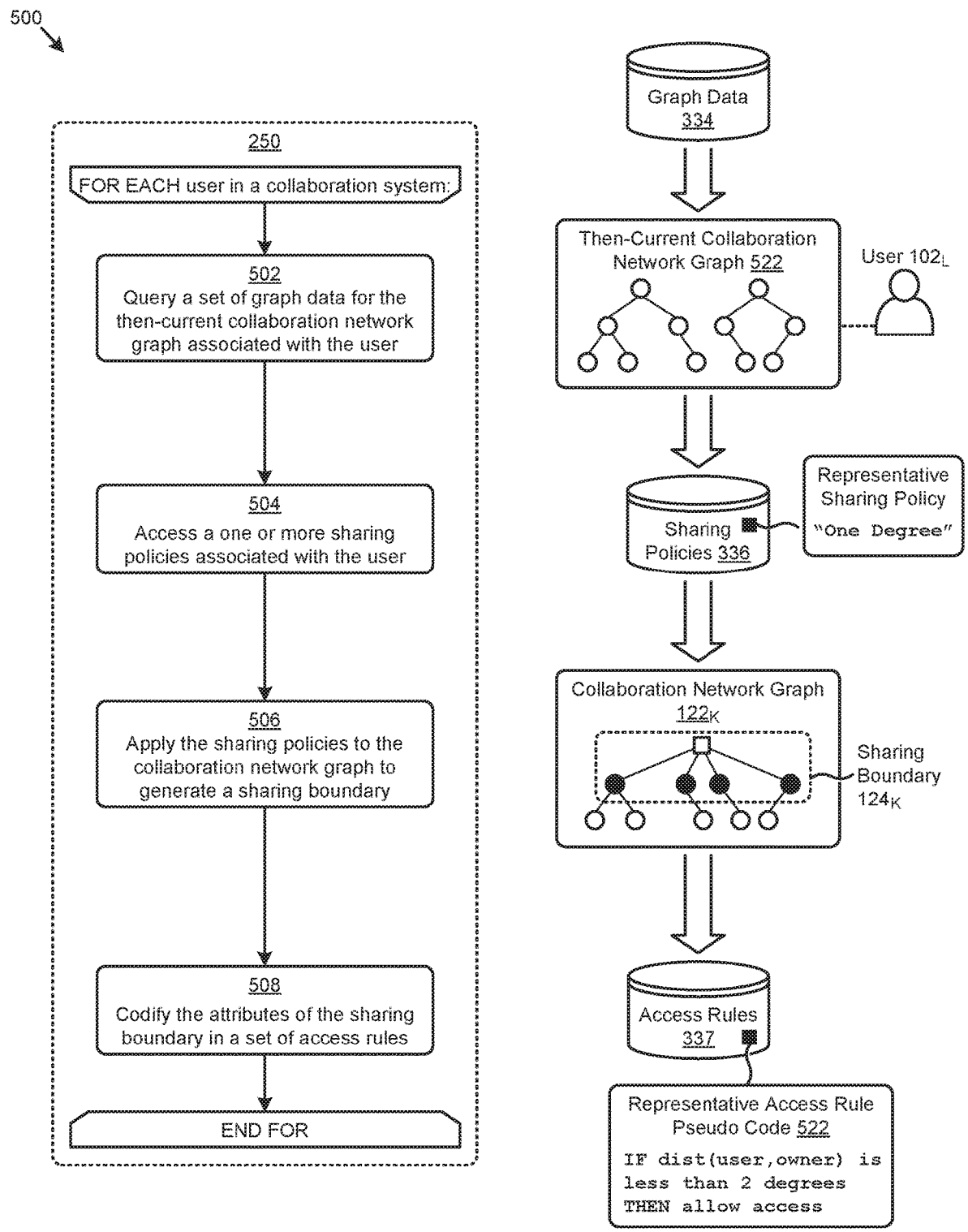
FIG. 5 presents a sharing boundary generation technique as implemented in systems that facilitate dynamic generation of sharing boundaries, according to an embodiment.

FIG. 5 presents a sharing boundary generation technique 500 as implemented in systems that facilitate dynamic generation of sharing boundaries. As an option, one or more variations of sharing boundary generation technique 500 or any aspect thereof may be implemented in the context of the architecture and functionality of the embodiments described herein. The sharing boundary generation technique 500 or any aspect thereof may be implemented in any environment.

FIG. 5 illustrates aspects pertaining to consulting actively-updated collaboration network graphs to determine the sharing boundaries of content objects. Specifically, the figure is presented to illustrate one embodiment of certain steps and/or operations that facilitate generating sharing boundaries that are associated with collaboration network graphs (e.g., step 250 of FIG. 2). A representative sharing boundary generation scenario is also shown in the figure to illustrate an example application of sharing boundary generation technique 500.

As shown, sharing boundary generation technique 500 is performed for each user in a collaboration system. Sharing boundary generation technique 500 commences by querying a set of graph data for the then-current collaboration network graph associated with a particular user (step 502). For example, graph data 334 might be queried to access a then-current collaboration network graph 522 that is associated with user $102_L$. The sharing policy or sharing policies associated with the user are accessed (step 504). Such sharing policies, such as the representative sharing policy "One Degree" might be stored in sharing policies 336.

The sharing policies are applied to the collaboration network graph to generate a sharing boundary (step 506). As illustrated, a sharing boundary $124_K$ associated with collaboration network graph $122_K$ is generated in accordance with an instance of sharing policies 336 associated with user $102_K$. Specifically, and as indicated by sharing boundary $124_K$, the sharing policy or policies associated with user $102_K$ might have specified that certain users that are one degree of separation (e.g., as determined by collaboration network graph $122_K$) from user $102_K$ are to be allowed access to various content objects owned by user $102_K$.

When the sharing boundary is determined, the attributes of the boundary are codified in a set of access rules (step 508). Access rules 337 earlier mentioned might store information that logically represents and serves to enforce the sharing boundary $124_K$ associated with user $102_K$ and collaboration network graph $122_K$. Specifically, and as depicted in the representative access rule pseudo code 522, an access rule associated with sharing boundary $124_K$ might allow access to any "user" characterized as having a distance (e.g., a degree of separation as calculated by a "dist ( )" function) that is "less than 2 degrees" from the content "owner".

The foregoing discussions include techniques for provisioning access to content objects based at least in part on dynamically-generated sharing boundaries (e.g., step 260 of FIG. 2), which techniques are disclosed in further detail as follows.

Figure 6:
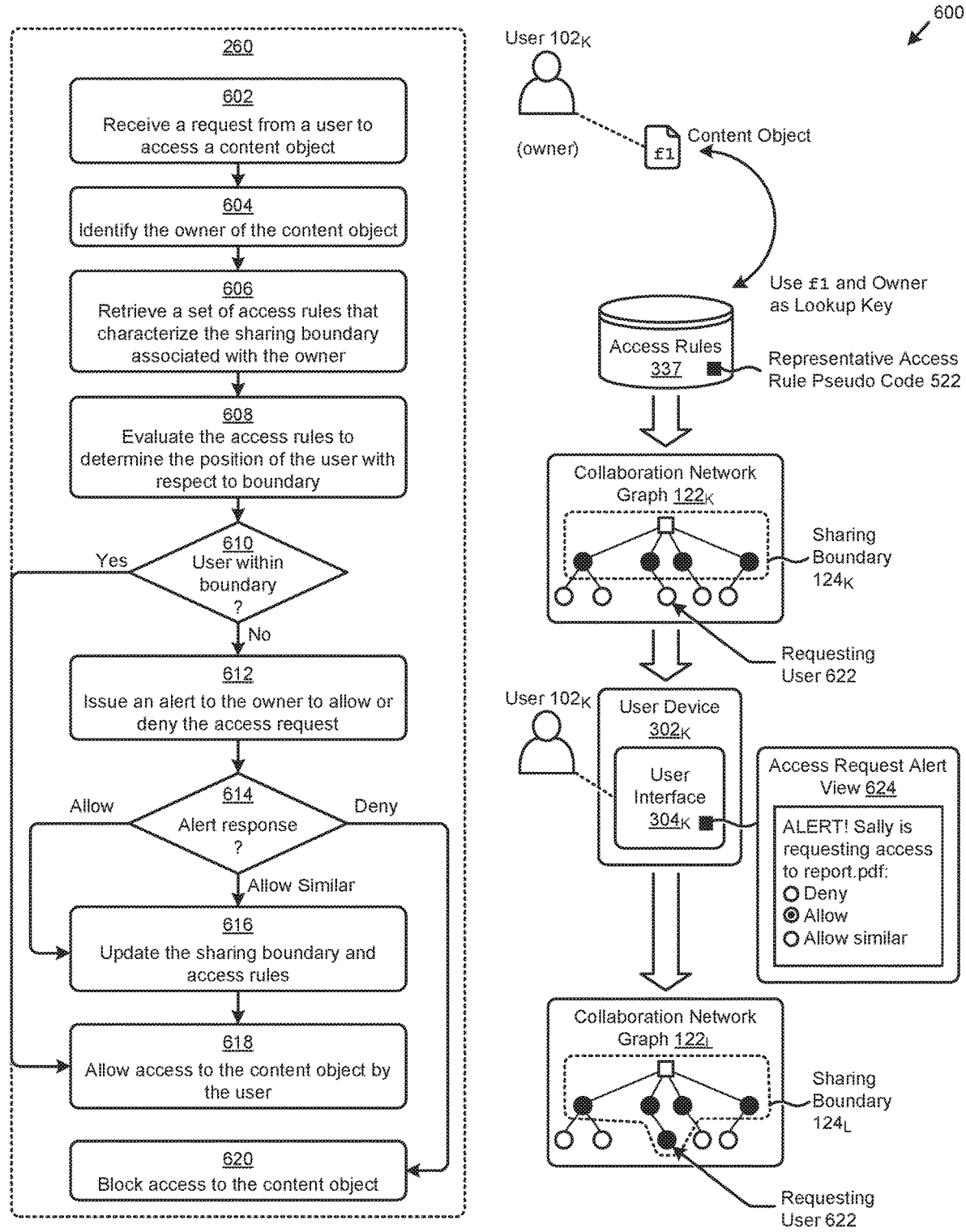
FIG. 6 presents a content object access provisioning technique as implemented in systems that facilitate dynamic generation of sharing boundaries, according to an embodiment.

FIG. 6 presents a content object access provisioning technique 600 as implemented in systems that facilitate dynamic generation of sharing boundaries. As an option, one or more variations of content object access provisioning technique 600 or any aspect thereof may be implemented in the context of the architecture and functionality of the embodiments described herein. The content object access provisioning technique 600 or any aspect thereof may be implemented in any environment.

FIG. 6 illustrates aspects pertaining to consulting actively-updated collaboration network graphs to determine the sharing boundaries of content objects. Specifically, the figure is presented to illustrate one embodiment of certain steps and/or operations that facilitate provisioning of access to content objects based at least in part on dynamically-generated sharing boundaries (e.g., step 260 of FIG. 2). A representative content object access provisioning scenario is also shown in the figure to illustrate an example application of content object access provisioning technique 600.

Content object access provisioning technique 600 commences by receiving a request from a user in a collaboration system to access a content object managed by the collaboration system (step 602). The received request is analyzed to identify the owner of the content object (step 604). In the accompanying scenario, user $102_K$ is identified as the "owner" of the content object being requested. A then-current set of access rules that characterize the sharing boundary associated with the identified owner is retrieved (step 606). Such access rules might be retrieved, for example, by querying a set of access rules 337 stored at the collaboration system. Moreover, and as illustrated, such retrieved access rules might define the sharing boundary $124_K$ associated with collaboration network graph $122_K$.

The access rules that are retrieve are evaluated to determine the position of the requesting user access with respect to the sharing boundary represented by the rules (step 608). If the requesting user is within the sharing boundary ("Yes" path of decision 610), then access to the content object by the user is allowed (step 618). As can be observed in the representative content object access provisioning scenario, however, the requesting user (e.g., requesting user 622) might be outside of the sharing boundary (e.g., sharing boundary $124_K$).

When the requesting user is outside of the sharing boundary ("No" path of decision 610), an alert is issued to the content owner to allow or deny the access request (step 612). For example, an access request alert, such as depicted in an access request alert view 624, might be presented at the user interface $304_K$ of the user device $302_K$ of user $102_K$. If the alert response (e.g., selecting the "Deny" radio button) from user $102_K$ indicates that access is to be denied ("Deny" path of decision 614), then access to the content object is blocked (step 620). If the alert response (e.g., selecting the "Allow" radio button) from user $102_K$ indicates that access is to be allowed ("Allow" path of decision 614), then the sharing boundary and access rules are updated (step 616) and access to the content object by the user is allowed (step 618). In some cases, if the alert response (e.g., selecting the "Allow Similar" radio button) from user $102_K$ indicates that access is to be allowed to users that are similar to the requesting user ("Allow Similar" path of decision 614), then the sharing boundary and access rules are updated to expand the sharing boundary to include users that are similar to the requesting user.

There are many ways for delivering an alert. Strictly as an example, an alert can be delivered to the content object owner by raising a signal at the owner's smart phone (e.g., using an email or text alert or using or banner, or other type of app notification). As another an example, an alert can be delivered to the content object owner by raising a signal at the owner's smart watch.

As shown, an updated sharing boundary (e.g., sharing boundary $124_L$) associated with collaboration network graph $122_L$ includes requesting user 622.

Additional Embodiments of the Disclosure

Additional Practical Application Examples

Figure 7:
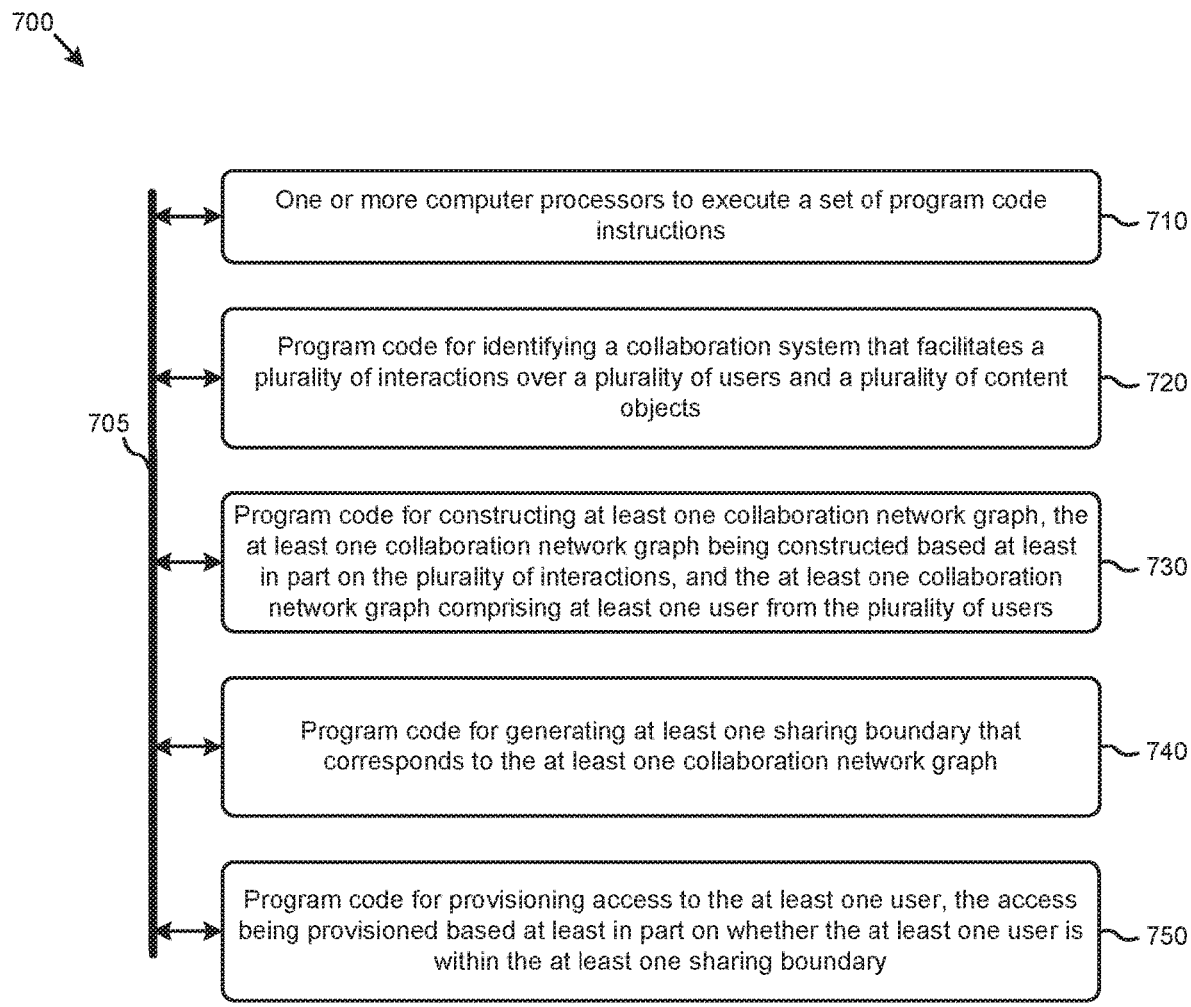
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually or as combined, serve to form improved technological processes that address unintended access to content objects by users in a collaboration system. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with any other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: identifying a collaboration system that facilitates a plurality of interactions over a plurality of users and a plurality of content objects (module 720); constructing at least one collaboration network graph, the at least one collaboration network graph being constructed based at least in part on the plurality of interactions, and the at least one collaboration network graph comprising at least one user from the plurality of users (module 730); generating at least one sharing boundary that corresponds to the at least one collaboration network graph (module 740); and provisioning access to the at least one user, the access being provisioned based at least in part on whether the at least one user is within the at least one sharing boundary (module 750).

Variations of the foregoing may include more or fewer of the shown modules. Certain variations may perform more or fewer (or different) steps and/or certain variations may use data elements in more or in fewer or in different operations. Still further, some embodiments include variations in the operations performed, and some embodiments include variations of aspects of the data elements used in the operations.

System Architecture Overview

Additional System Architecture Examples

Figure 8A:
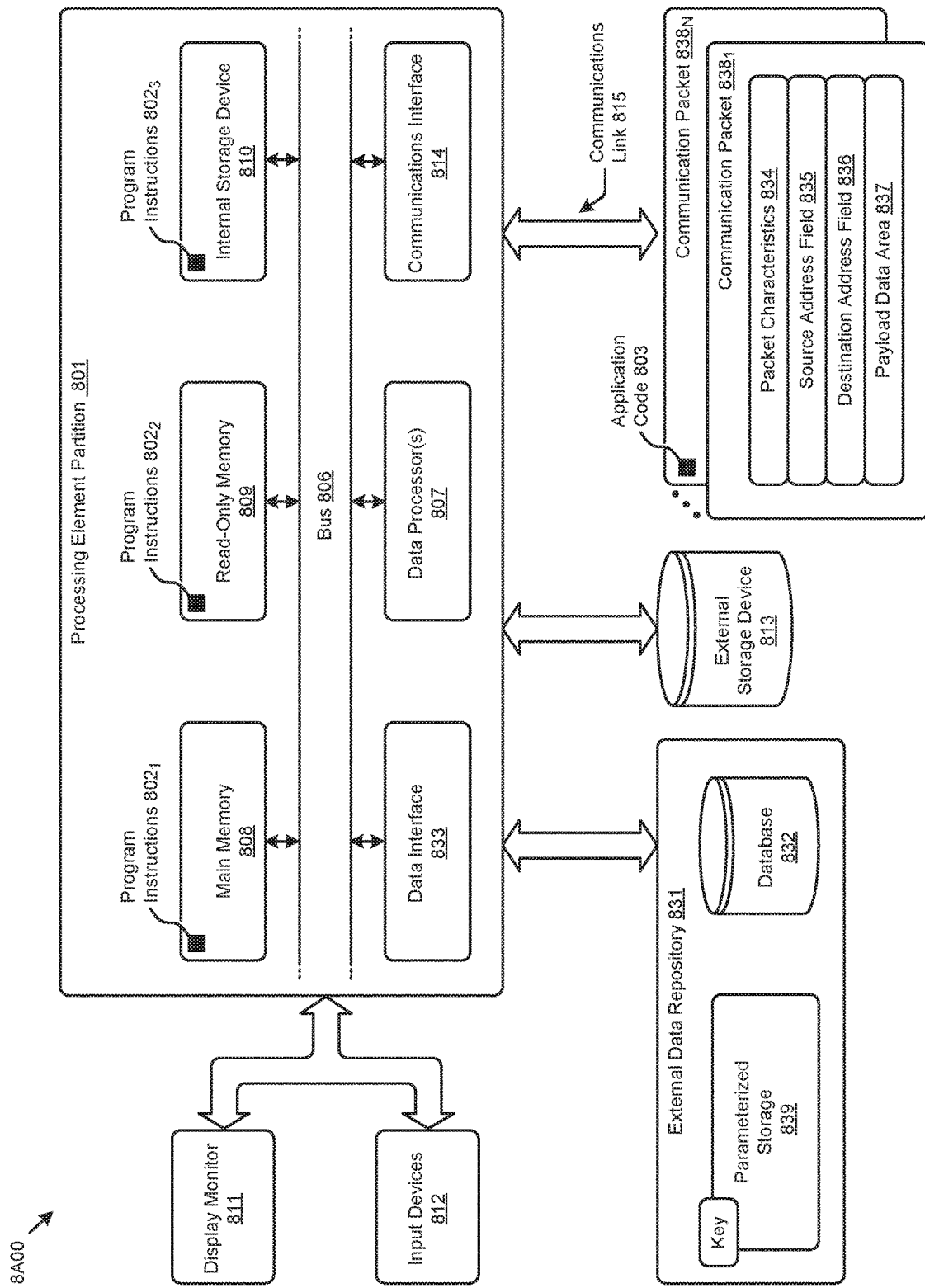
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to dynamic generation of sharing boundaries. A module may include one or more state machines and/or combinational logic used to implement or facilitate the operational and/or performance characteristics pertaining to dynamic generation of sharing boundaries.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamic generation of sharing boundaries). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to dynamic generation of sharing boundaries, and/or for improving the way data is manipulated when performing computerized operations pertaining to consulting actively-updated collaboration network graphs to determine the sharing boundaries of content objects.

Figure 8B:
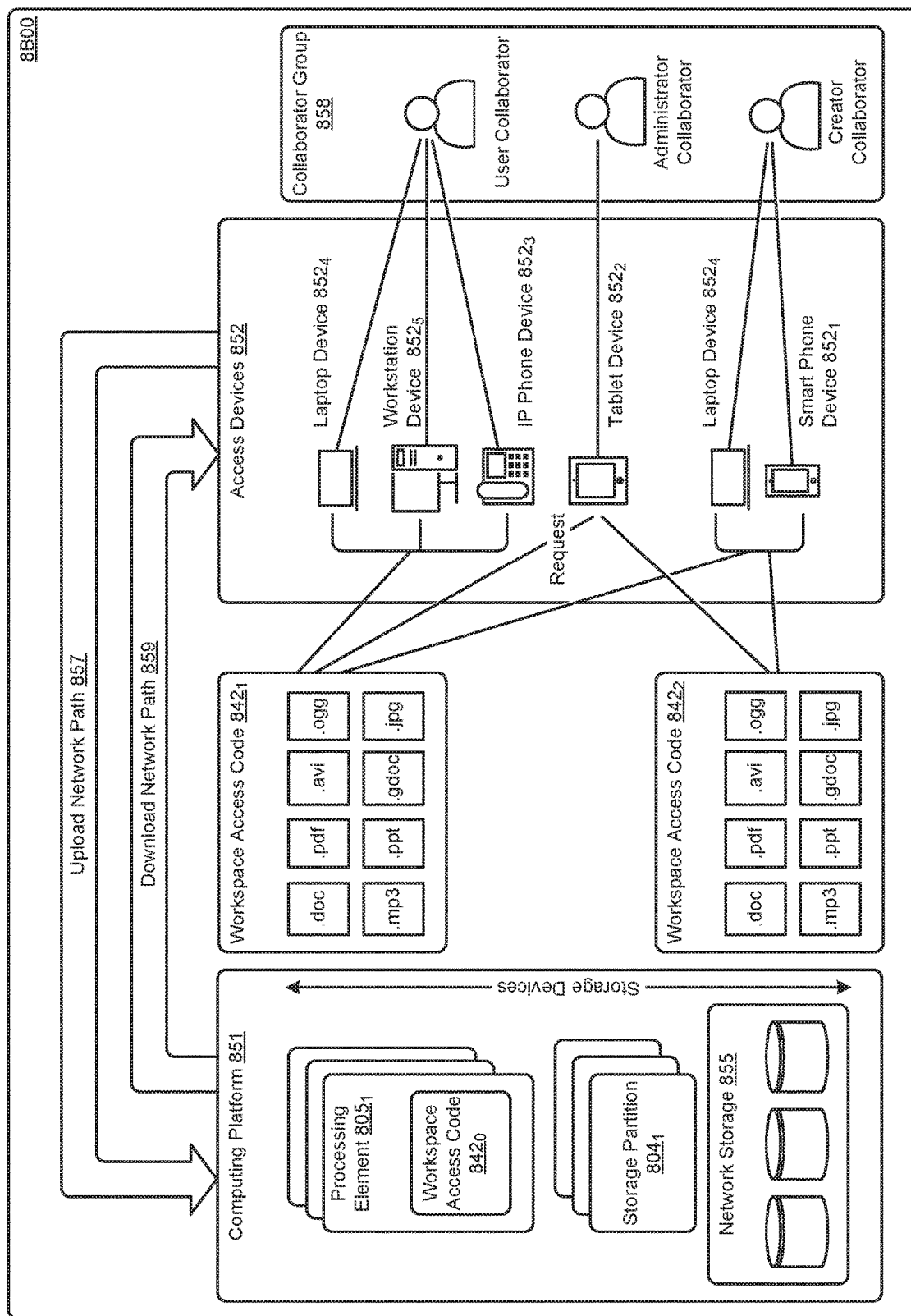

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of access devices 852 (e.g., laptop device $852_4$, workstation device $852_5$, IP phone device $852_3$, tablet device $852_2$, smart phone device $852_1$, etc.), and can be configured to access any type of object. Strictly as examples, such objects can be folders or directories or can be files of any filetype. A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as networked storage 855. Storage of workspaces and/or any constituent files or objects, and/or any other code or scripts or data can be stored in any one or more storage partitions (e.g., storage partition 804$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for dynamically generating sharing boundaries, the method comprising:
   configuring a collaboration system that provides network access to a plurality of content objects, wherein the collaboration system facilitates collaboration interactions between particular users by allowing or denying network access to the plurality of content objects;
   observing user-to-user or user-to-content collaboration interactions over the plurality of content objects, the user-to-user or user-to-content collaboration interactions comprising sharing invitations;
   constructing a collaboration network graph, the collaboration network graph being constructed based at least in part on observed collaboration interactions over at least some of the plurality of content objects;
   generating a sharing boundary, based at least in part on the collaboration network graph and a sharing policy, wherein the sharing policy is based at least in part on a degree of separation;
   provisioning access to at least one of the plurality of content objects, the access being provisioned based at least in part on the sharing boundary; and
   updating the sharing boundary based at least in part on the collaboration network graph, wherein the collaboration network graph has been actively updated.

2. The method of claim 1, further comprising:
   detecting that at least one user is outside of the sharing boundary; and
   issuing an alert.

3. The method of claim 2, further comprising:
   receiving a response to the alert; and
   performing one or more operations, the one or more operations being based at least in part on the response.

4. The method of claim 3, wherein the one or more operations comprise at least one of, denying access to a content object by the at least one user, allowing access to the content object by the at least one user, or updating the sharing boundary.

5. The method of claim 1, wherein the sharing boundary is based at least in part on one or more sharing policies, wherein the one or more sharing policies are associated with a respective of at least one of the particular users.

6. The method of claim 5, wherein at least a portion of the one or more sharing policies are based at least in part on one or more content owner directives.

7. The method of claim 1, wherein the sharing boundary is based at least in part on a degree of separation, wherein users with n degree of separation are included in the sharing boundary and users with n+1 degree of separation are excluded from the sharing boundary.

8. The method of claim 1, wherein at least one of, one or more machine learning techniques, or one or more clustering techniques, are used to construct the collaboration network graph.

9. The method of claim 1, wherein the collaboration network graph is associated with a respective at least one of the particular users.

10. The method of claim 1, wherein constructing the collaboration network graph or generating the sharing boundary is responsive to receiving at least one of, at least one user interaction event, at least one access request, or at least one content owner directive.

11. The method of claim 10, wherein the at least one access request is issued in response to clicking on a link associated with a content object.

12. A non-transitory computer readable medium having stored thereon a sequence of instructions which, when stored in memory and executed by one or more processors causes the one or more processors to perform a set of acts for dynamically generating sharing boundaries, the set of acts comprising:
   configuring a collaboration system that provides network access to a plurality of content objects, wherein the collaboration system facilitates collaboration interactions between particular users by allowing or denying network access to the plurality of content objects;
   observing user-to-user or user-to-content collaboration interactions over the plurality of content objects, the user-to-user or user-to-content collaboration interactions comprising sharing invitations;
   constructing a collaboration network graph, the collaboration network graph being constructed based at least in part on observed collaboration interactions over at least some of the plurality of content objects;
   generating a sharing boundary, based at least in part on the collaboration network graph and a sharing policy, wherein the sharing policy is based at least in part on a degree of separation;
   provisioning access to at least one of the plurality of content objects, the access being provisioned based at least in part on the sharing boundary; and
   updating the sharing boundary based at least in part on the collaboration network graph, wherein the collaboration network graph has been actively updated.

13. The non-transitory computer readable medium of claim 12, further comprising instructions which, when stored in memory and executed by the one or more processors causes the one or more processors to perform acts of:
   detecting that at least one user is outside of the sharing boundary; and
   issuing an alert.

14. The non-transitory computer readable medium of claim 13, further comprising instructions which, when stored in memory and executed by the one or more processors causes the one or more processors to perform acts of:
   receiving a response to the alert; and performing one or more operations, the one or more operations being based at least in part on the response.

15. The non-transitory computer readable medium of claim 14, wherein the one or more operations comprise at least one of, denying access to a content object by the at least one user, allowing access to the content object by the at least one user, or updating the sharing boundary.

16. The non-transitory computer readable medium of claim 12, wherein the sharing boundary is based at least in part on one or more sharing policies, wherein the one or more sharing policies are associated with a respective of at least one of the particular users.

17. The non-transitory computer readable medium of claim 16, wherein at least a portion of the one or more sharing policies are based at least in part on one or more content owner directives.

18. The non-transitory computer readable medium of claim 12, wherein the sharing boundary is based at least in part on a degree of separation, wherein users with n degree of separation are included in the sharing boundary and users with n+1 degree of separation are excluded from the sharing boundary.

19. A system for dynamically generating sharing boundaries, the system comprising:
- a non-transitory computer readable storage medium having stored thereon a sequence of instructions; and
- one or more processors that execute the sequence of instructions to cause the one or more processors to perform a set of acts, the set of acts comprising,
- configuring a collaboration system that provides network access to a plurality of content objects, wherein the collaboration system facilitates collaboration interactions between particular users by allowing or denying network access to the plurality of content objects;
- observing user-to-user or user-to-content collaboration interactions over the plurality of content objects, the user-to-user or user-to-content collaboration interactions comprising sharing invitations;
- constructing a collaboration network graph, the collaboration network graph being constructed based at least in part on observed collaboration interactions over at least some of the plurality of content objects;
- generating a sharing boundary, based at least in part on the collaboration network graph and a sharing policy, wherein the sharing policy is based at least in part on a degree of separation;
- provisioning access to at least one of the plurality of content objects, the access being provisioned based at least in part on the sharing boundary; and
- updating the sharing boundary based at least in part on the collaboration network graph, wherein the collaboration network graph has been actively updated.

20. The system of claim 19, wherein the sharing boundary is based at least in part on a degree of separation, wherein users with n degree of separation are included in the sharing boundary and users with n+1 degree of separation are excluded from the sharing boundary.

* * * * *